United States Patent Office 2,956,581
Patented Oct. 18, 1960

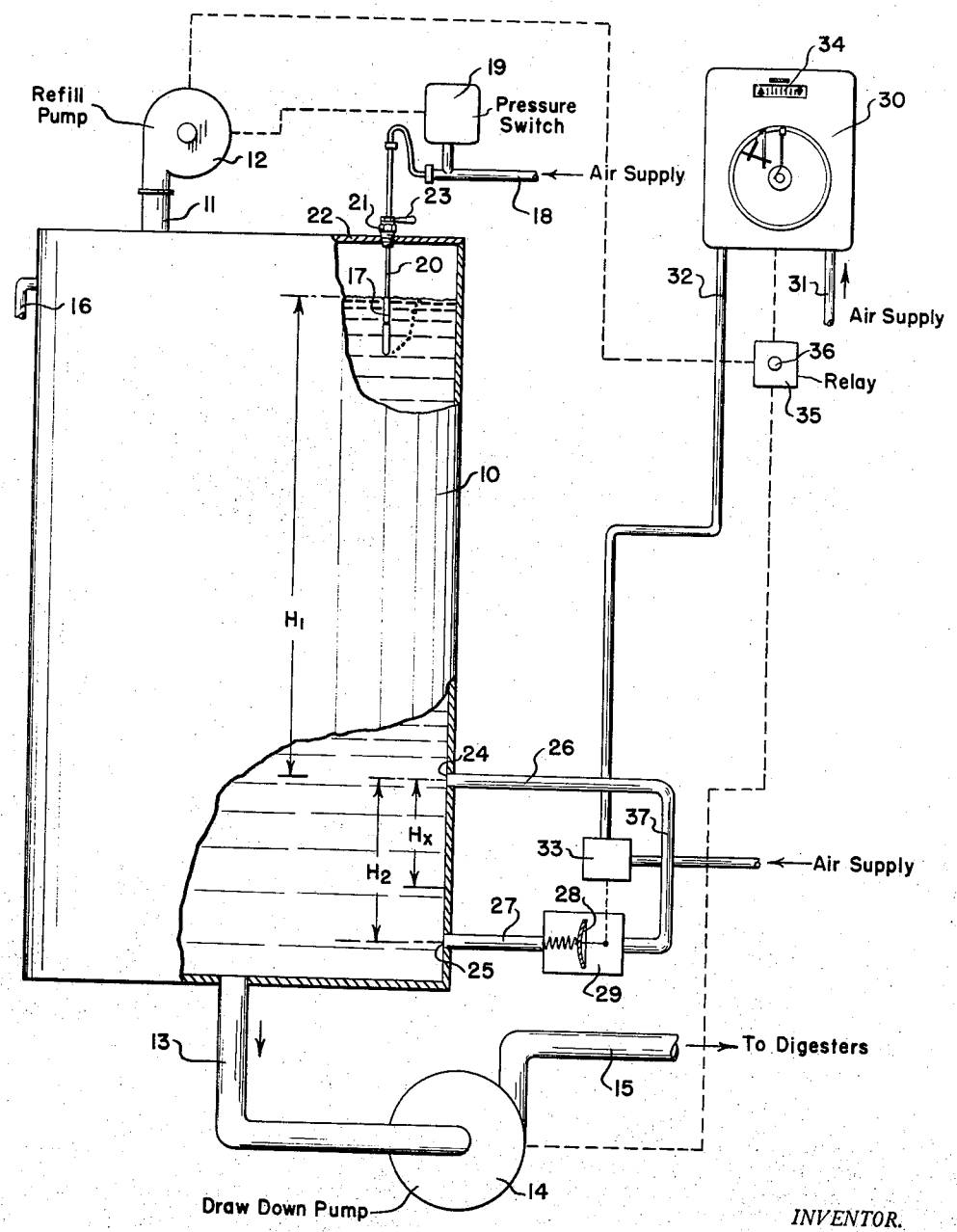

2,956,581
LIQUID DISCHARGE MEASURING MEANS

Robert L. Pearson, Wilmington, N.C., assignor to Riegel Paper Corporation, New York, N.Y., a corporation of Delaware Filed Mar. 7, 1958, Ser. No. 719,952

7 Claims. (Cl. 137—391)

The present invention relates to liquid measurement, and more particularly to novel and improved arrangements for measuring and controlling the discharge of liquid from a vessel. While the invention has many uses, its various advantages are realized in connection with the measurement of liquid in paper making operations and the invention will therefore be described in that environment.

In the manufacture of paper pulp, for example, wood chips are cooked in a large vat, known as a digester, in the presence of a solution known as white liquor. The cooking is a batch operation, and after each batch the digester is refilled with chips and a large measured volume of liquor. In accordance with conventional practice, liquor is stored in an auxiliary vessel, which is filled during a cooking operation and from which a measured volume of liquor is discharged into the digester preparatory to a subsequent batch operation.

Conventionally, a measured volume of liquid is discharged from the storage vessel by using a control system including a device adapted to sense the liquid pressure near the bottom of the vessel. During the discharge of liquid, when the pressure sensed by the device reaches a predetermined value, indicating the discharge of a predetermined head or column of liquid, the withdrawing or discharging means is shut off. The actual volume of liquid discharged is known from the relation of the liquid head or column to the cross-sectional area of the vessel.

Although vessels such as those used for holding white liquor are usually of substantial diameter, it may be necessary to withdraw a liquid column of 150 to 200 inches, for example, to obtain the desired liquid volume. Because of this, substantial difficulties arise in measuring the discharge of liquid accurately with conventional means. Thus, in a conventional system, which operates in response to the pressure head of the fluid in the vessel, an error of, for example, 2 percent represents a 4 inch liquid column and a substantial volume of liquid, where the vessel is of large diameter.

In accordance with the present invention, a discharge measuring system is provided which, with conventional measuring or indicating instrumentalities, is operative to measure discharged liquid with greatly increased accuracy and in a manner substantially independent of the magnitude of the liquid column or head. The arrangement is such that, with conventional instrumentalities, measuring accuracy may readily be increased four or five times.

More specifically, the invention provides a novel and improved liquid discharge measuring system, which controls or indicates liquid discharge in response to the liquid pressure head between two pressure points, both of which are located substantially below the liquid level when the vessel is full. One of the pressure points is located a known and accurately determinable distance below the initial liquid level and the other pressure point is located a known distance below the first pressure point. The initial level of the liquid in the vessel may be accurately regulated so that a predetermined volume of liquid, somewhat less than the total volume to be discharged, lies above the first pressure point. Accordingly, to discharge the desired volume of liquid, the liquid level is lowered to a point between the spaced pressure points. When the level falls below the first pressure point a pressure differential is registered on the conventional instrumentalities, and further discharge is discontinued when the pressure differential reaches a predetermined value. Since the vertical distance between the two pressure points may be a relatively small fraction of the total column or head of liquid to be discharged, measuring accuracy is greatly increased, as compared to that of conventional systems, which act in response to the overall liquid column.

For a better understanding of the invention, reference should be made to the following detailed description and to the accompanying drawing which is a simplified schematic representation of a liquid discharge system incorporating the improved means of the invention.

Referring now to the drawing, the reference numeral 10 designates generally a tank or vessel of substantial diameter and height. By way of example, a vessel used in the paper industry, for holding a supply of white liquor, may be in the order of 50 or more inches in diameter and about 250 inches in height. Associated with the vessel 10 is a filling line 11 and pump 12 leading to a suitable source of supply (not shown) for pumping liquid into the vessel at desired times. At the bottom of the vessel is a discharge line 13 which, in the illustrated arrangement, is connected to the intake of a pump 14. An outlet line 15, leading from the pump 14, is connected to a pulp digester, for example, which is arranged to receive liquid from the vessel. The pump 14 may be of the positive displacement type, or may be associated with suitable valve means (not shown) so that liquid is discharged from the vessel 10 only when the pump 14 is in operation. Adjacent the top of the vessel is an overflow pipe 16, which limits the extent to which the vessel may be filled with liquid.

Mounted on the top wall of the vessel, and extending downward into the interior thereof, is a liquid level control element 17, which may be more or less conventional in its operation. The illustrated control element 17 comprises a tube connected to a source 18 of air under low pressure. The lower end of the tube is open, permitting air to flow out of the tube in a relatively unobstructed manner, when the liquid level in the vessel 10 is below the end of the tube. When the liquid rises above the end of the tube, air escapes against the pressure of the liquid, causing an increase of air pressure between the control element 17 and the source 18. A pressure sensitive switch 19 is connected in the air line and is adapted to detect an increase in pressure when the control element 17 becomes partially submerged. When the head or column of liquid above the end of the control element 17 reaches a predetermined maximum, the pressure sensitive switch 19 is tripped to discontinue the flow of liquid to the vessel 10, as by stopping the pump 12.

Advantageously, the control element 17 is adjustable with respect to the bottom of the vessel, so that filling of the vessel may be discontinued at various liquid levels. To this end, the element 17 may comprise an elongated tubular section 20 received slidably in a fitting 21 mounted on the top wall 22 of the vessel. The fitting 21 is provided with releasable clamping means 23, whereby the tube 20 may be gripped in any adjusted position.

In accordance with the invention, the vessel 10 is provided adjacent its lower end with openings 24, 25 which receive conduits 26, 27 respectively. The conduits 26, 27 communicate with the interior of the vessel and with the opposite sides of a diaphragm 28 of a pressure sensitive device 29. The openings 24, 25, which may be referred to as pressure points, are spaced vertically from each other and are so located that the upper pressure point 24 is a substantial distance below the maximum liquid level of the tank, as determined by the control element 17. By way of example, the pressure points 24, 25 may be separated by a vertical distance of 50 inches, while the upper pressure point, 24, may be located about 150 inches below the maximum liquid level. The diaphragm 28 is located at a level not substantially above and advantageously level with or below the lower pressure point 25, as indicated in the drawing. The diaphragm is thus exposed on one side to the pressure of the liquid column above the lower pressure point 25 and on the other side to the pressure of the liquid column above the upper pressure point 24 plus the pressure of the column of fluid in the conduit 26.

Associated with the pressure responsive device 29 is a control mechanism 30, which may be of conventional design, and is adapted to execute a desired control function in response to air pressure conditions in conduits 31, 32. The conduits 31, 32 are connected to a common air supply source, and the conduit 32 has connected therein an air pressure regulating device 33 controlled by the diaphragm 28 of the liquid pressure sensitive device 29. The control mechanism 30, which includes suitable adjusting means, indicated at 34, is operative when the pressure differential in conduits 31, 32 reaches a predetermined value to actuate an electrical relay 35. In the illustrated arrangement, the relay 35 has contacts connected to the respective pumps 12, 14 and arranged such that, when the relay 35 is actuated, the pump 14 is shut off and the refill pump 12 is started.

In the operation of the new system, the vessel 10 is filled with liquid by operation of the refill pump 12, which draws liquid from a suitable supply. When the level of the liquid in the vessel rises above the lower end of the control element 17, air flowing through the element must overcome resistance of the liquid, in proportion to the head of liquid above the lower end of the element. When the back pressure of the liquid becomes sufficiently great, the pressure switch 19 in the air supply line is tripped to shut off the refill pump 12.

The filled level of the liquid in the vessel 10 may be accurately regulated by raising or lowering the control element 17 and/or by adjusting the pressure switch 19 to actuate at different pressure levels. The arrangement is such that, when the vessel is filled, a known volume of liquid, represented by the liquid column $H_1$, lies above the upper pressure point 24. And the adjusted setting of the control element 17 and/or pressure switch 19 is such that the volume of the fluid column $H_1$ is slightly less than the total volume of liquid desired to be withdrawn from the vessel.

In accordance with the invention, the desired total volume of liquid to be withdrawn from the vessel exceeds the volume represented by the column $H_1$ by an amount less than the total volume represented by the liquid column $H_2$, contained in the vessel between the respective pressure points 24, 25. Accordingly, the desired total volume to be withdrawn may be accurately measured by measuring a column of liquid $H_x$ below the pressure point 24 which, when added to the volume of liquid in the column $H_1$, makes the desired volume.

Withdrawal of liquid is initiated by setting the withdrawal pump 14 into operation, with a manual switch 36 or other suitable means. When sufficient liquid is withdrawn to lower the liquid level in the vessel below the first pressure point 24, a liquid pressure differential will appear on the opposite sides of the diaphragm 28. That is, while the fluid pressure on the right-hand side of the diaphragm remains constant, by reason of a column equal to $H_2$ standing in the conduit section 37, the liquid pressure on the left-hand side of the diaphragm is progressively decreased as the liquid level in the vessel drops below the pressure point 24. The pressure differential thus created causes the diaphragm 28 to change positions and to adjust appropriately the air pressure regulating valve 33. And, when the liquid level in the vessel reaches a predetermined distance below the upper pressure point 24, equivalent to a distance $H_x$, differential air pressure in the conduits 31, 32 cause the control device 30 to actuate the relay 35, simultaneously shutting off the withdrawal pump 14 and starting the refill pump 12.

The liquid column represented by $H_x$ may be varied readily, to constitute any fraction of the column $H_2$ contained between the pressure points 24, 25. This is accomplished by appropriate adjustment of the control device 30, so that the device carries out a control function in response to a predetermined adjusted pressure differential in the conduits 31, 32.

One of the important advantages of the invention is that accurately measured volumes of liquid may be withdrawn from large vessels, utilizing conventional instrumentalities. Thus, in withdrawing a column of liquid of perhaps 200 inches, a known volume, constituting perhaps 80 percent of the total desired volume, is first withdrawn, and the withdrawal of the remaining portion of the liquid is accurately measured to arrive at the desired total. By measuring only the last portion of liquid, constituting a small fraction of the total, measuring accuracy may be increased by a factor of several times, as compared to prior systems, in which the entire column withdrawn is measured.

For many applications, the latitude of adjustment or regulation of total volume to be withdrawn is sufficient where the lower 25 percent, for example, of the total liquid column may be measured. However, additional substantial adjustment, covering the entire volume range of the vessel if desired, may be afforded by providing for appropriate adjustment of the filling control, as by the control element 17 and/or pressure switch 19.

Although the invention is not thus limited, it is particularly applicable for measuring quantities of white liquor to be supplied to a pulp digester in a paper making operation. In such operations, large volumes of corrosive liquor are supplied periodically to pulp digesters, from intermediate storage vessels of large dimensions. Accurate measurement of the liquor supplied is desirable not only from the standpoint of proper digester operation, but also from the standpoint of operating efficiency.

It should be understood, however, that the specific apparatus herein illustrated and described is intended to be representative only, as certain changes may be made therein without departing from the clear teachings of the disclosure. Accordingly, reference should be made to the following appended claims in determining the full scope of the invention.

I claim:

1. In combination with a vessel for holding a supply of liquid, controllable intake means for supplying liquid to the vessel, and means to withdraw liquid from the vessel, an improved system for controlling the volume of liquid withdrawn comprising means for limiting the liquid level in the vessel to a predetermined maximum, said means for limiting comprising means to effectively close said intake means upon said liquid level rising to said predetermined maximum and to maintain said intake means effectively closed throughout an operation of liquid withdrawal, pressure sensitive means for controlling the flow of liquid out of the vessel, first pressure conducting means connecting the pressure sensitive means to the interior of the vessel at a first pressure point substantially below the maximum liquid level, and second pressure conducting means connecting the pressure sensitive means to the interior of the vessel at a second pressure point below the first pressure point, the distance between the first and second pressure points being small in relation to the distance between the first pressure point and the maximum liquid level, the pressure sensitive means including means responsive differentially to the pressure in said first and second pressure conducting means to effect discontinuance of the flow of liquid out of the vessel after the liquid level has fallen a predetermined distance below the first pressure point.

2. The combination of claim 1, in which the means for limiting the liquid level in the vessel is adjustable with reference to said pressure points whereby the maximum liquid level may be varied in relation to the pressure points.

3. The combination of claim 2, in which the means for limiting comprises a member projecting downward into the vessel and being adjustable relative to the bottom wall of the vessel.

4. The combination of claim 1, in which the means to withdraw comprises an electrically energizable element for causing liquid to flow from the vessel, and the pressure sensitive means includes means for actuating the energizable element.

5. The combination of claim 1, in which the pressure sensitive means comprises a pressure sensitive device having a movable diaphragm, the first pressure conducting means exposes one side of the diaphragm to the first pressure point and the second pressure conducting means exposes the other side of the diaphragm to the second pressure point.

6. The combination of claim 5, in which the diaphragm is positioned below the first pressure point, and the first pressure conducting means comprises a liquid-filled conduit for maintaining a constant pressure on the said one side of the diaphragm after the liquid level in the vessel has been withdrawn to a level below said first pressure point.

7. The combination of claim 5, which includes an air pressure regulating device connected to said diaphragm and controllable thereby, said regulating device being connected to a source of air under pressure, and the output of the regulating device being connected to a portion of a pressure differential sensing control device, another portion of said control device being connected to said source of air under pressure, said control device being adapted to control the means to withdraw fluid from the vessel in response to air pressure differentials sensed therein.

References Cited in the file of this patent

UNITED STATES PATENTS

| | | |
|---|---|---|
| 127,917 | Painter | June 11, 1872 |
| 1,981,530 | Thomas | Nov. 20, 1934 |
| 2,069,917 | Fischer | Feb. 9, 1937 |
| 2,246,391 | Sorensen | June 17, 1941 |
| 2,717,516 | Swift et al. | Sept. 13, 1955 |

FOREIGN PATENTS

| | | |
|---|---|---|
| 225,031 | Switzerland | Apr. 1, 1943 |